(12) United States Patent
DiGregorio

(10) Patent No.: US 9,236,050 B2
(45) Date of Patent: Jan. 12, 2016

(54) SYSTEM AND METHOD FOR IMPROVING SPEECH RECOGNITION ACCURACY IN A WORK ENVIRONMENT

(71) Applicant: Vocollect, Inc., Pittsburgh, PA (US)

(72) Inventor: David R. DiGregorio, Greensburg, PA (US)

(73) Assignee: Vocollect Inc., Pittsburgh, PA (US)

( * ) Notice: Subject to any disclaimer, the term of this patent is extended or adjusted under 35 U.S.C. 154(b) by 229 days.

(21) Appl. No.: 13/826,967

(22) Filed: Mar. 14, 2013

(65) Prior Publication Data

US 2014/0278387 A1 Sep. 18, 2014

(51) Int. Cl.
*G10L 25/48* (2013.01)
*G10L 15/20* (2006.01)
*H04R 5/033* (2006.01)

(52) U.S. Cl.
CPC ............. *G10L 15/20* (2013.01); *G10L 25/48* (2013.01); *H04R 5/033* (2013.01); *H04R 2201/107* (2013.01)

(58) Field of Classification Search
CPC ...................................................... G10L 15/22
USPC ......................... 704/231, 234; 381/328, 312
See application file for complete search history.

(56) References Cited

U.S. PATENT DOCUMENTS

| 7,496,387 | B2 | 2/2009 | Byford et al. | |
|---|---|---|---|---|
| 7,885,419 | B2 | 2/2011 | Wahl et al. | |
| 2003/0067585 | A1* | 4/2003 | Miller et al. | 351/123 |
| 2003/0068057 | A1* | 4/2003 | Miller et al. | 381/334 |
| 2006/0069557 | A1* | 3/2006 | Barker et al. | 704/234 |
| 2007/0038442 | A1* | 2/2007 | Visser et al. | 704/233 |
| 2007/0150268 | A1* | 6/2007 | Acero et al. | 704/226 |
| 2008/0304360 | A1* | 12/2008 | Mozer | 367/117 |
| 2011/0141925 | A1* | 6/2011 | Velenko et al. | 370/252 |
| 2011/0255725 | A1* | 10/2011 | Faltys et al. | 381/328 |

* cited by examiner

*Primary Examiner* — Michael N Opsasnick
(74) *Attorney, Agent, or Firm* — Additon, Higgins & Pendleton, P.A.

(57) ABSTRACT

Apparatus and method that improves speech recognition accuracy, by monitoring the position of a user's headset-mounted speech microphone, and prompting the user to reconfigure the speech microphone's orientation if required. A microprocessor or other application specific integrated circuit provides a mechanism for comparing the relative transit times between a user's voice, a primary speech microphone, and a secondary compliance microphone. The difference in transit times may be used to determine if the speech microphone is placed in an appropriate proximity to the user's mouth. If required, the user is automatically prompted to reposition the speech microphone.

19 Claims, 4 Drawing Sheets

SYSTEM AND METHOD FOR IMPROVING SPEECH RECOGNITION ACCURACY IN A WORK ENVIRONMENT

FIELD OF THE INVENTION

Embodiments of the invention relate to speech-based systems, and in particular, to systems for speech-directed or speech-assisted work environments that utilize speech recognition.

BACKGROUND OF THE INVENTION

Speech recognition has simplified many tasks in the workplace by permitting hands-free communication with a computer as a convenient alternative to communication via conventional peripheral input/output devices. A user may enter data and commands by voice using a device having processing circuitry with speech recognition features. Commands, instructions, or other information may also be communicated to the user by a speech synthesizes circuitry of the processing circuitry. Generally, the synthesized speech is provided by a text-to-speech (TTS) engine in the processing circuitry. Speech recognition finds particular application in mobile computing environments in which interaction with the computer by conventional peripheral input/output devices is restrictive or otherwise inconvenient.

For example, wearable or otherwise portable computer devices can provide a user that performs a variety of work-related tasks with desirable computing and data-processing functions, while offering the user enhanced mobility within the workplace. One particular area, for example, in which users rely heavily on such speech-based devices is inventory management. Inventory-driven industries rely on computerized inventory management systems for performing various diverse tasks, such as food and retail product distribution, manufacturing, and quality control. An overall integrated management system typically includes a combination of a central computer system for tracking and management, and the people who use and interface with the computer system in the form of order fillers and other users. In one scenario, the users handle the manual aspects of the integrated management system under the command and control of information transmitted from the central computer system to the wireless mobile device and to the user through a speech-driven interface.

As the users process their orders and complete their assigned tasks, a bi-directional dialog or communication stream of information is provided over a wireless network between the users wearing wireless devices and the central computer system that is directing multiple users and verifying completion of their tasks. To direct the user's actions, information received by each mobile device from the central computer system is translated into speech or voice instructions for the corresponding user. Typically, to receive the voice instructions, the user wears a headset coupled with the mobile device.

The headset includes one or more microphones for spoken data entry, and one or more speakers for playing audio. Speech from the user is captured by the headset and is converted using speech recognition functionalities into data used by the central computer system. Similarly, instructions from the central computer or mobile device are delivered to the user as speech via the TTS engine's generation of speech and audio and the headset speaker. Using such mobile devices, users may perform assigned tasks virtually hands-free so that the tasks are performed more accurately and efficiently.

However, a system's ability to accurately recognize and process the user's speech is dependent on the quality of the speech audio that is captured from the user. This will depend upon the user's ability or desire to properly use the equipment so that such use facilitates the capture of quality speech audio. The audio quality, in turn, is partially dependent on a variety of parameters, some of which are controllable by a user and others that are not. For example, captured speech quality may depend on the quality of the microphones, the orientation of the microphone with respect to the mouth of the user, the background noise that is captured with the user's speech, and other factors. While the headset manufacturer can address some issues and parameters, such as microphone quality, they cannot control other parameters, such as the user's operation of the device.

If the microphone is not positioned properly with respect to the user's mouth, for example, the ratio of user speech versus background noise (signal to noise ratio SNR) decreases. As a result, the voice recognition system may not receive a quality speech input, and may misinterpret the user's spoken audio. This degrades the speech recognition process and increases processing error rates. It also requires repetition of previously spoken dialog, instructions, or commands. Some users particularly have problems because they do not want the microphone in front of their face, and choose to orient the microphone in a position that does not facilitate accurate capture of the user's voice. For example, moving the speech microphone so that it is adjacent to the user's forehead or below their chin or otherwise out of the way, often produces unacceptable voice quality and a poor signal to noise ratio (SNR).

Therefore, there is a need to ensure suitable speech quality and subsequent speech recognition.

SUMMARY OF THE INVENTION

In accordance with one aspect of the present invention, a system is provided having a speech microphone to receive a user's voice, a compliance microphone to serve as a secondary and fixed reference to a user's voice, an earpiece speaker for transmitting audio signals to the user, and processing circuitry configured to measure and calculate the relative difference in transit time between the user's speech audio and each of the microphones. The processing circuitry is configured to use the transit time data to determine if the user's speech microphone is properly and/or improperly oriented and/or positioned. The processing circuitry provides the user with an audio prompt to adjust or move the improperly placed speech microphone, if required.

In accordance with another aspect of the present invention, a method is provided to monitor the position of a user's speech microphone, and prompt the user to reconfigure the speech microphone's orientation if required. The method comprises the steps of capturing a user's speech audio by using a speech microphone and a compliance microphone, comparing the relative transit times between the user's mouth and each of the microphones, comparing the difference in transit time to an acceptable threshold level, and alerting the user to move the position of the speech microphone if required.

It should be understood that the appended drawings are not necessarily to scale, presenting a somewhat simplified representation of various features illustrative of the basic principles of embodiments of the invention. The specific design features of embodiments of the invention as disclosed herein, including, for example, specific dimensions, orientations, locations, and shapes of various illustrated components, as well as specific sequences of operations (e.g., including concurrent and/or sequential operations), will be determined in part by the particular intended application and use environment. Certain features of the illustrated embodiments may have been enlarged or distorted relative to others to facilitate visualization and provide a clear understanding.

DETAILED DESCRIPTION OF EMBODIMENTS OF THE INVENTION

In the following detailed description of the invention, numerous specific details are set forth in order to provide a thorough understanding of the invention. However, it is to be understood that the invention may be practiced without these specific details. In other instances, well known methods, procedures, components, and circuits have not been described in detail so as not to unnecessarily obscure aspects of the invention.

The present invention is directed to a system for improving speech recognition accuracy, by monitoring the position of a user's headset-mounted speech microphone, and prompting the user to move or reposition the speech microphone if required.

Figure 1:
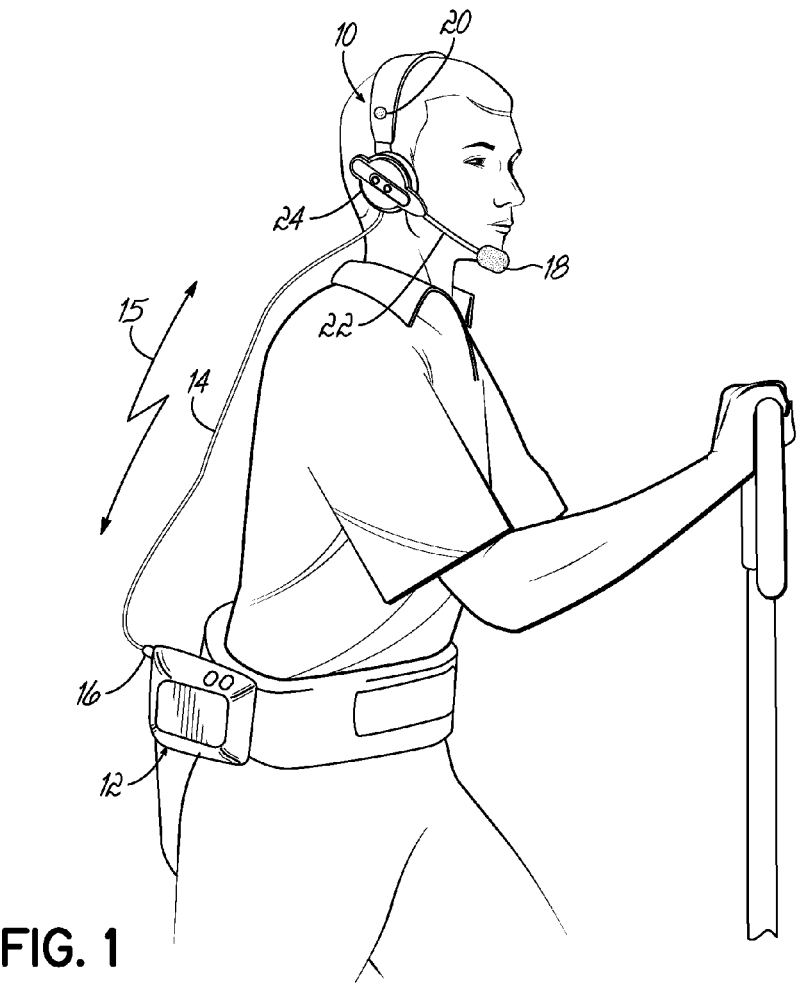
FIG. 1 is a perspective view of a user operating a system which incorporates the present invention.

FIG. 1 depicts an exemplary system for implementing the invention, including a user-worn headset assembly 10 coupled to a portable computer terminal or other device 12 by a communication cable 14 or wireless link 15. The communication cable 14 may interface with the portable computer terminal 12 by utilizing a suitable plug 16 and mating receptacle (not shown). In an alternate embodiment, the headset assembly 10 may communicate wirelessly with the portable computer terminal 12 using available wireless technology, such as Bluetooth technology.

Figure 2:
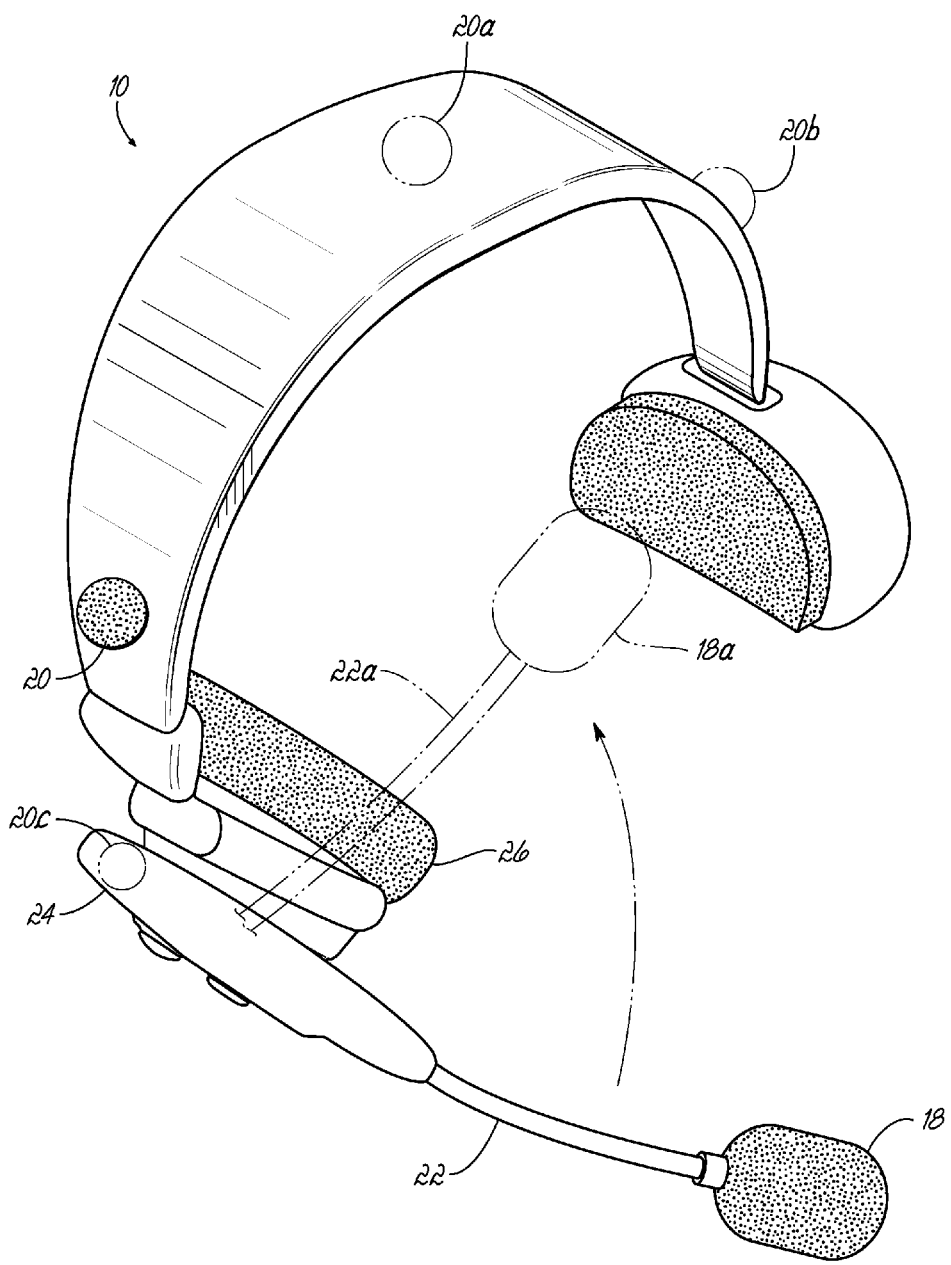
FIG. 2 is an enlarged perspective view of the headset of FIG. 1 which incorporates the speech microphone and compliance microphone components of the present invention.

The headset assembly 10 includes a speech microphone 18, such as a boom microphone, and another microphone 20. The microphone 20 can have a number of other uses, such as for noise cancellation, and will be considered herein, with respect to the invention, as a compliance microphone 20. The compliance microphone 20 may be attached at the depicted location of FIG. 2, or at other points on the headset assembly 10, as seen in FIG. 2, or might be attached at location 20c on the earpiece assembly 24 of the boom 22 holding the microphone 20. Generally, the compliance microphone is fixed and would be exposed to the noise of the environment and to the speech of the user. The speech microphone 18 may be positioned in a plurality of positions. In the illustrated embodiment, the boom 22 coupled to microphone 18 may be coupled to a rotatable earpiece assembly 24. The user may also position the speech microphone 18 by bending or otherwise contorting the flexible speech microphone boom 22, which can be made of a flexible, yet shape retaining, material.

FIG. 2 is an enlarged view of the headset assembly 10. An earpiece speaker 26 is located coaxially with the earpiece assembly 24. The speaker may be used to provide audio prompts or commands or feedback to the user. The speech microphone 18 and speech microphone boom 22 may be positioned in front of the user's mouth, as shown at 18 and 22. Alternatively, the speech microphone 18 and speech microphone boom 22 can be located at points more distant from the user's mouth, to include positions at 18a and 22a for example. The compliance microphone 20, can be located at various positions 20, 20a, 20b, 20c, or at other fixed points on the headset assembly 10, or with respect to the headset assembly. The fixed location of the compliance microphone 20 is not required to be adjusted or otherwise relocated by the user and will generally be permanently fixed.

A device, such as the portable computer terminal 12 or headset assembly 10, can be configured to be operable to monitor a specific parameter associated with the headset and/or the microphones, and provide an audio prompt to the user to make an adjustment with respect to the headphone assembly. In one specific embodiment of the invention, the device monitors the speech audio signals or speech audio, such as user speech, that is detected and captured by the speech microphone 18 and the compliance microphone 20. The captured speech is used by the device for speech recognition applications. While the illustrated embodiment shows a separate headset assembly 10 and terminal 12, the processing circuitry and functionality of the separate devices could be combined in a headset such that the headset incorporates its traditional functions, along with the functions of the terminal device 12.

The system, in accordance with one embodiment of the present invention, monitors the audio signals that are captured by the headset assembly 10, and particularly the speech audio signals captured by microphones 18 and 20 in order to instruct a user to position or reposition microphone 18 to improve the signal quality of captured user speech. The present invention, by improving the quality of the captured user speech, also improves the overall speech recognition process. In accordance with one aspect of the present invention, a user is advised, with an audio prompt or message, when the system determines that a particular parameter associated with the headset should be changed, and advises the user how to change the parameter. For example, the parameter monitored may be the position of the headset, and the processing circuitry of a device may determine that microphone 18 is not properly positioned in a desirable position or a functional position for capturing the user speech and providing quality audio signals for speech recognition.

To that end, the system incorporates suitable processing circuitry for processing the plurality of electrical signals associated with input audio captured by the microphones 18, 20. In accordance with one aspect of the invention, the processing circuitry for incorporating the invention might be implemented within the portable computer terminal 12. For example, such a portable terminal device might be a TALKMAN® device available from Vocollect, Inc. of Pittsburgh, Pa. In an alternative embodiment of the invention, the processing circuitry might be implemented directly into the headset assembly 10. Therefore, the invention is not limited with respect to where the processing circuitry is located, as long as it is suitably coupled for monitoring a parameter associated with a headset, such as for processing input microphone signals in accordance with the aspects of the invention.

Figure 1A:
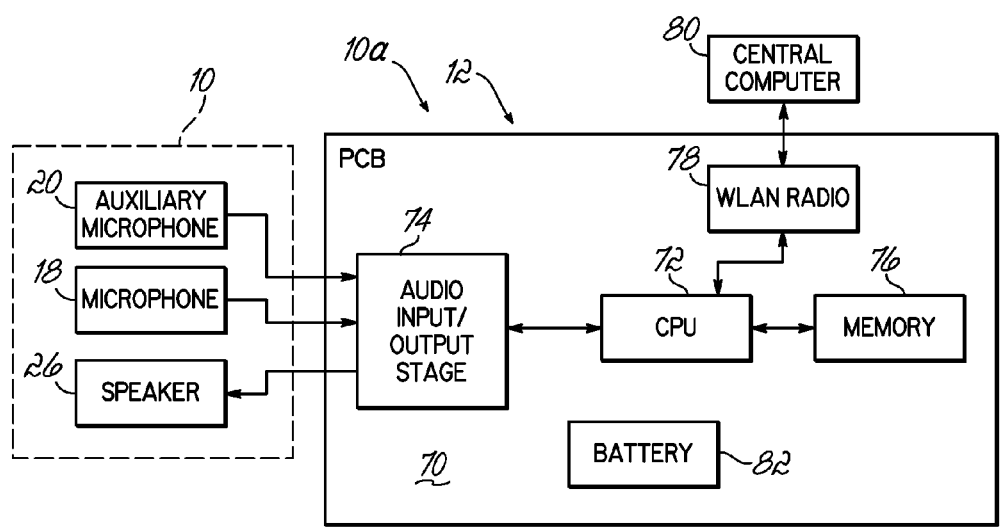
FIG. 1A is a block diagram of an embodiment of the system.

FIG. 1A illustrates suitable processing circuitry that might be implemented for the purposes of the invention. Specifically, the processing circuitry 70 may include one or more suitable processors or CPU's 72. An audio input/output stage 74 is appropriately coupled to a headset assembly 10 for coupling the processing circuitry 70 with the microphones 18, 20 and speaker 26. Processor 72 might be incorporated with one or more memory elements 76, as appropriate for implementation of the invention. Generally, memory element 76 will contain the necessary software and applications that are executed by the processor 72 for implementing the invention. The processing circuitry might also incorporate a suitable radio, such as a WLAN radio, for coupling to a central computer or server 80, as is appropriate in various speech-directed/speech-assisted work environments. To that end, the processing circuitry 70 and processor 72 might also run one or more speech recognition applications and text-to-speech (TTS) applications, as appropriate for such speech-directed or speech-assisted work environments. The processing circuitry 70 is powered by an appropriate power source, such as battery 80. As noted, the processing circuitry might be implemented in terminal 12, or might be included in the actual headset assembly, as evidenced by reference numeral 10a in FIG. 1A.

In accordance with one aspect of the invention, the processing circuitry is coupled to receive the electrical signals from microphones 18, 20 that correspond to or are associated with the captured speech audio, such as user speech. The processing circuitry 70 is configured to process the signals associated with the captured speech audio to determine if the speech microphone is properly positioned or in a desirable position with respect to a user's mouth. Processing circuitry 70 then provides suitable commands, prompts, or other information to a user, such as through speaker 26, to instruct a user to move or reposition the microphone 18 as appropriate to improve the quality of the speech that is received from a user, for the purposes of improved speech recognition.

Different speech microphone locations or positions, as illustrated by numerals 18 and 18a will produce distinct and different electrical signals reflective of captured speech audio at those locations. Depending on the position of the microphones with respect to the user's mouth, the speech audio will take a greater or lesser amount of time to travel from the user's mouth to a microphone. The invention, in one aspect, uses a measurement of the different transit times for the speech audio and the different microphones to determine if the speech microphone is properly positioned for use with speech recognition applications.

Figure 3A:
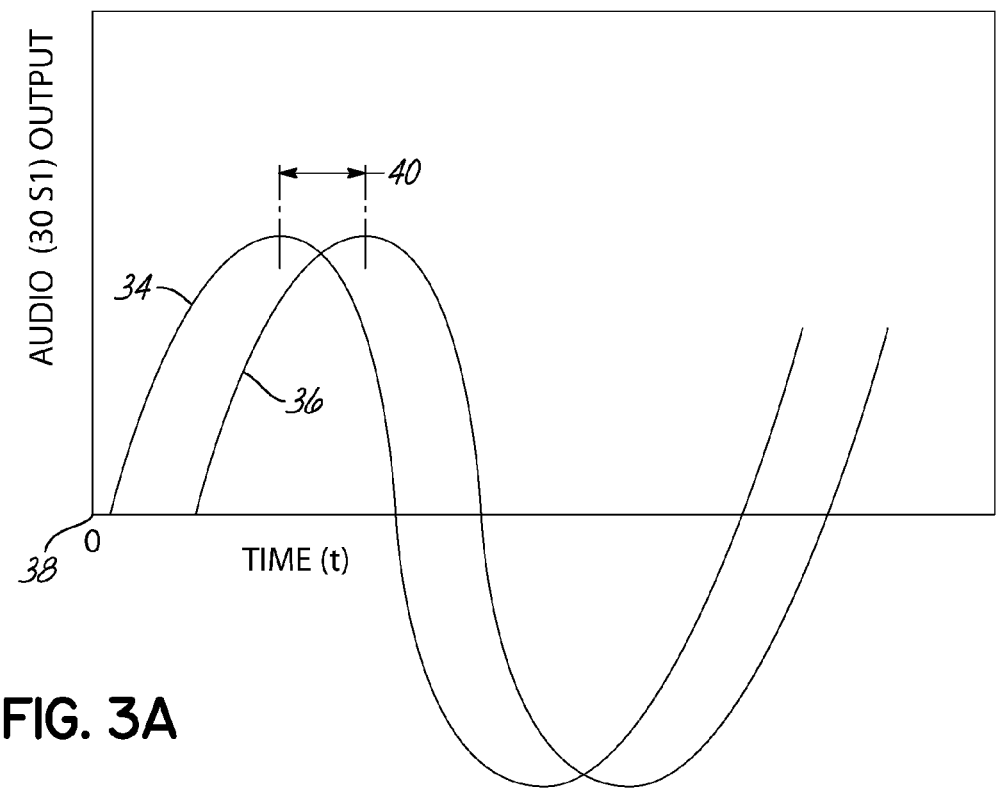
FIG. 3A is a graph comparing the signal traces produced by a compliance microphone, and speech microphone oriented closely to a user's mouth.
Figure 3B:
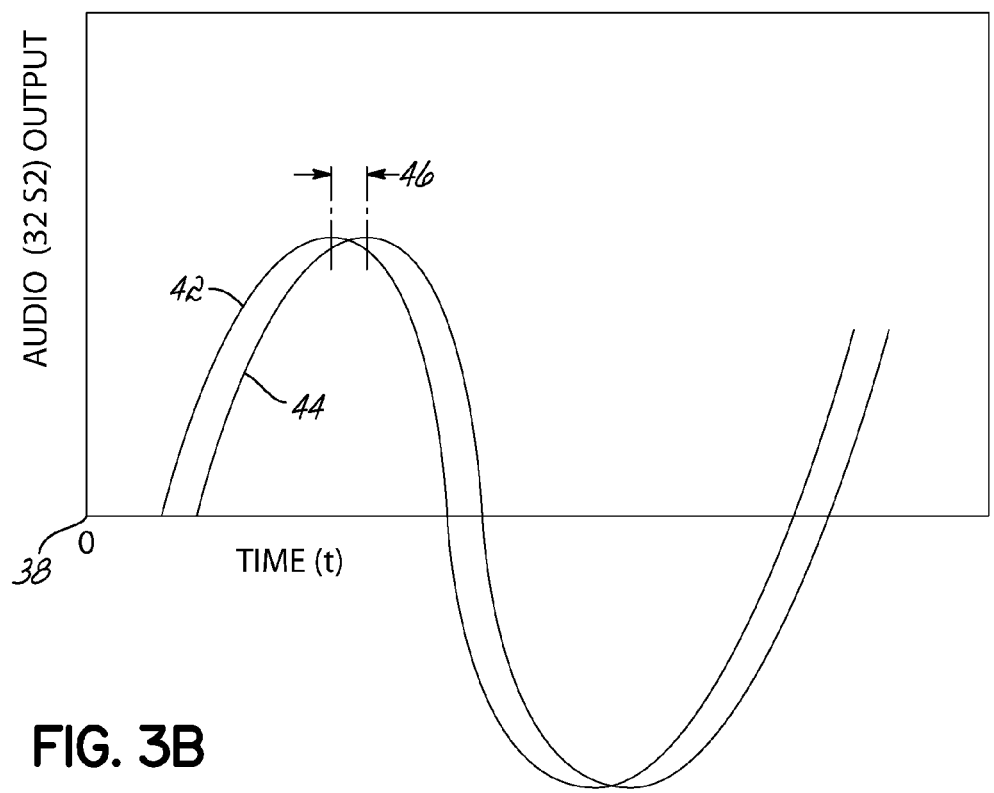
FIG. 3B is a graph comparing the signal traces produced by a compliance microphone, and a speech microphone oriented relatively distant from a user's mouth.

More specifically, the signals from the microphones 18, 20 are received and processed by the processing circuitry 70. FIGS. 3A and 3B show two plots of captured speech audio 30 and 32 resulting from the different exemplary positions of speech microphone illustrated as 18 and 18a respectively. In plot 30 S1 of FIG. 3A, the captured speech audio detected or captured by the speech microphone 18 is reflected by electrical signal trace 34. The speech audio detected or captured by the compliance microphone 20 is then shown as electrical signal trace 36. The traces of FIG. 3A represent the configuration where the speech microphone 18 is properly located in a position very close to the user's mouth. The proper or desirable position will be that position that provides captured speech audio that has a desirable quality for use with a speech recognition application. Usually, for most applications, the proper position for microphone 18 is to be located close to the user's mouth. Therefore, the signal trace 34 is reflective of audio signals that are detected close in time to the actual user speech event indicated at point 38 on FIG. 3A. This is a somewhat short transit time from mouth to microphone. Because of the location of the compliance microphone 20 on the headset assembly or elsewhere, the audio of the user speech is detected some time slightly after the audio that is detected by speech microphone 18. Thus, in one embodiment of the invention, the transit time of the speech with respect to multiple microphones 18, 20 is monitored. There is a measurable transit time difference, illustrated as a phase differential $\Delta_{near}$ 40, between the time that the speech event 38 is detected by the speech microphone 18 and the time that the speech event is detected by compliance microphone 20, as illustrated in FIG. 3A.

However, if the speech microphone is in a different position from one that is desirable for properly capturing a speech input, such as if the microphone is moved from position 18 of FIG. 2 to position 18a of FIG. 2, or to another position, the transit time and resulting phase differential will change. In plot 32 S2, the trace of the speech audio detected or captured by speech microphone of position 18a is shown as trace 42 and the speech audio detected or captured by the compliance microphone 20 is shown as trace 44. Since these traces represent the configuration where the speech microphone position 18a is located farther away from the user's mouth, there is an increased transmit time delay between the speech event 38 and the captured speech audio at the speech microphone 18. The transmit time for the speech audio to travel to the fixed location of the compliance microphone 20 would generally be unchanged since the position of microphone 20 is stationary with respect to the user's mouth. The position 18a of the microphone is closer to the position of microphone 20. Therefore, they each receive the speech closer in time (e.g., closer transmit time). The phase differential $\Delta_{far}$ 46 between the time that the speech event 38 is detected by the speech microphone of position 18a and the compliance microphone 20 is smaller than phase differential $\Delta_{near}$ 40.

In the illustrated embodiment, the speech microphone 18 is moved closer to compliance microphone 20, such as by moving the speech microphone 18 and its boom 22 to the positions illustrated in FIG. 2 as 18a, 22a. For example, the speech microphone might be moved above the mouth of the user, and closer to their forehead if the user wants the microphone away from the front of their face. Alternatively, speech microphone 18 might be moved to a position that is below the user's mouth. In such a scenario, the microphone 18 might be moved farther away from microphone 20, but the speech signals and their transit times may still indicate a smaller $\Delta$ in phase since the speech may reach both microphones at a similar time. Depending on how far away from the user's mouth that the microphone 18 is moved, it might also result in the speech reaching the microphone 20 before microphone 18. That is, referring to FIGS. 3A, 3B, the $\Delta$ phase differential might be considered negative. The phase differential might thus be reflected as a positive or negative delay. The processing circuitry handles both scenarios. When speech microphone 18 is moved with respect to the desired position next to a user's mouth, the phase differential $\Delta_{far}$ 46 would indicate a speech microphone location and audio condition that may degrade the quality of the captured speech audio, and thus, degrade the speech recognition process. The present invention, by monitoring the transmit time differences and phase differential $\Delta$, determines if the speech microphone is properly positioned in a desirable position, such as near a user's mouth. If the speech microphone is in an undesirable or improper position, the user is instructed to move the microphone to a different and more desirable position.

In one embodiment of the invention, the system may store a phase differential threshold that is used to indicate a minimally-acceptable Δ and microphone position to ensure the quality of the captured speech for a speech recognition application. The threshold might be determined experimentally, based upon a number of different microphone locations for the speech microphone 18 and resulting speech recognition parameters. For example, the threshold might be associated with a minimal desirable recognition error rate. Processing circuitry 70 then periodically measures the transit time differences or phase differential between the electrical signals corresponding to the speech audio captured by the speech microphone and the speech audio captured by the compliance microphone. If the phase differential does not exceed the threshold, the user would then be prompted with an audio prompt to move the speech microphone or adjust the position of the speech microphone, such as to move it closer to the user's mouth. As will be appreciated, given the spatial separation between a compliance microphone 20 and the speech microphone 18, it will be desirable to have the speech microphone capture the user's speech more quickly, thus yielding a desirable phase differential with respect to the speech captured by the compliance microphone. The positioning of the compliance microphone with respect to the headset assembly might be varied, as appropriate, and might be determined experimentally to provide the best measurement scenario for determining the phase differential between the signals captured by each of the microphones in accordance with the invention.

In accordance of another aspect of the invention, once an undesirable phase differential is determined to have occurred between the microphones 18, 20, such that the signal traces are similar to those illustrated in FIG. 3B, processing circuitry 70 will operate the suitable speech recognition/synthesis application of the invention to synthesize an audio prompt or message for a user to adjust the position of the speech microphone. Alternatively, a pre-recorded message might also be played. The prompt or message is played to the user through speaker 26. The user can adjust the position of microphone 18 to address the prompt. A further monitoring of the microphone position might then occur on a periodic basis to ensure proper speech recognition.

Figure 4:
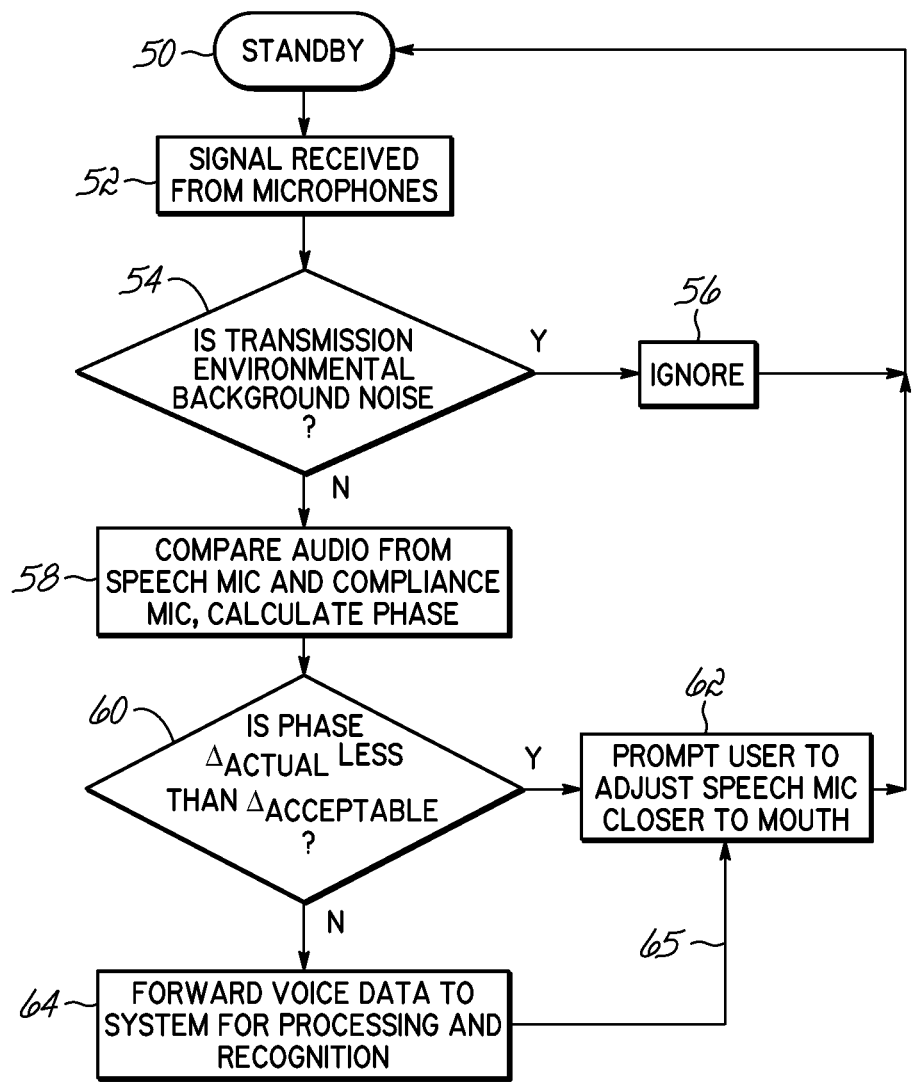
FIG. 4 is a flowchart representation of the processing steps implemented by the present invention.

FIG. 4 is a flowchart depicting how the system software may operate in accordance with one aspect of the invention to utilize the phase differential Δ between the audio signals detected by the speech microphone 18 and the compliance microphone 20, to improve the quality of the received audio and speech recognition process. The system waits in standby mode 50 until at 52 an audio signal is detected by the speech microphone 18 and the compliance microphone 20. Once the audio signal is detected, block 54 determines if the signal captured by the microphones 18, 20 is environmental background noise. The determination that the audio signal is noise or user speech may be handled in various different ways by the processing circuitry. For example, background noise from a far away source will generally be received by microphones 18, 20 at effectively the same time. If the signal is found to be background noise, it is ignored at 56, and the system returns to standby 50. If the signal is a valid speech audio signal, block 58 compares the signals reflective of the captured audio from the speech microphone 18 with the signals from the compliance microphone 20. The system and processing circuitry then calculate the phase differential $\Delta_{actual}$ of those captured signals.

At 60, if the phase differential $\Delta_{actual}$ is greater than or equal to a selected or predefined threshold, phase differential $\Delta_{acceptable}$, then the captured speech audio undergoes further processing and speech recognition at 64 as normal for speech recognition systems. If the phase differential $\Delta_{actual}$ is less than phase differential $\Delta_{acceptable}$, this indicates that the system has detected an improperly or undesirably placed speech microphone 18. Block 62 then audibly prompts the user, through the earpiece speaker 26, to position the microphone closer to his mouth, and the system returns to standby 50. As noted, the audible prompt might be from the TTS capabilities of the processing circuitry, or may be a pre-recorded message. As illustrated in FIG. 4, an alternative scenario might still use the captured speech audio even if the microphone is not in a proper position. The captured speech audio might still be used for recognition and a prompt provided to move the microphone for future use. That is, as shown by block 64 and path 65. Alternatively, the system might refuse to accept the speech audio for further processing until the microphone is actually moved.

While the present invention has been illustrated by the description of the embodiments thereof, and while the embodiments have been described in considerable detail, it is not the intention of the applicant to restrict or in any way limit the scope of the appended claims to such detail. Additional advantages and modifications will readily appear to those skilled in the art. Therefore, the invention in its broader aspects is not limited to the specific details of representative apparatus and method, and illustrative examples shown and described. Accordingly, departures may be made from such details without departure from the spirit or scope of applicant's general inventive concept.

What is claimed is:

1. A system for improving a speech recognition process, said system comprising:
   a speech microphone configured to capture speech audio from a user and output corresponding electrical signals;
   at least one additional microphone, in a fixed location configured to capture speech audio from the user and output corresponding electrical signals;
   a headset assembly, comprising a flexible boom or movable earpiece assembly allowing the speech microphone to be placed in a position away from the user's mouth, wherein the at least one additional microphone is in proximity with the speech microphone when the speech microphone is in the position away from the user's mouth;
   processing circuitry coupled to receive signals from the microphones that are associated with the captured speech audio, the processing circuitry configured to process the signals associated with the captured speech audio and to determine if the speech microphone is in the position away from the user's mouth, the processing circuitry further configured to provide an audio prompt if the speech microphone is in the position away from the user's mouth; and
   a speaker configured to play the audio prompt for a user to advise them to move the speech microphone to a different position.

2. The system of claim 1 wherein the audio prompt advises the user to move the speech microphone closer to the mouth of the user.

3. The system of claim 1, wherein the flexible boom or movable earpiece assembly allows the user to position said microphone in a plurality of positions with respect to the user's mouth.

4. The system of claim 1, where the processing circuitry is further configured to use the signals associated with the captured speech audio from the speech microphone and at least one additional microphone and calculate the difference in transit time for the speech audio to travel from the user's mouth to the speech microphone and to travel from the user's mouth to the at least one additional microphone.

5. The system of claim 4 wherein the calculated difference is determined as a phase differential $\Delta\text{actual}$.

6. The system of claim 5, where the processing circuitry is configured to compare the phase differential $\Delta\text{actual}$ to a phase differential threshold $\Delta\text{acceptable}$ to determine if the speech microphone is positioned in the position away from the user's mouth.

7. The system of claim 6 wherein the phase differential threshold $\Delta\text{acceptable}$ is related to a speech recognition parameter.

8. The system of claim 6, wherein a phase differential threshold $\Delta\text{acceptable}$ is selectable.

9. The system of claim 1, wherein the processing circuitry is configured to perform speech recognition on the received signals from the speech microphone that are associated with the captured speech audio.

10. The system of claim 1 further comprising a portable computer terminal, the processing circuitry being contained in the portable computer terminal.

11. The system of claim 1 further comprising a headset assembly containing the speech microphone, at least one additional microphone and speaker, the processing circuitry being contained in the headset assembly.

12. A method for improving a speech recognition process, said method comprising:
    capturing speech audio from a user with a speech microphone and at least one additional microphone and outputting corresponding electrical signals, the at least one additional microphone in proximity with the speech microphone when the speech microphone is in a position away from the user's mouth;
    processing signals associated with the captured speech audio and determining if the speech microphone is in the position away from the user's mouth; and
    if the speech microphone is in the position away from the user's mouth, providing an audio prompt to a user to advise them to move the speech microphone to a different position.

13. The method of claim 12 further comprising positioning the at least one additional microphone at a fixed location with respect to the speech microphone.

14. The method of claim 12 further comprising advising the user to move the speech microphone closer to the mouth of the user.

15. The method of claim 12 further comprising using the signals associated with the captured speech audio from the speech microphone and at least one additional microphone and calculating the difference in transit time for the speech audio to travel from the user's mouth to the speech microphone and to travel from the user's mouth to the at least one additional microphone.

16. The method of claim 15 further comprising determining the calculated difference as a phase differential $\Delta\text{actual}$ and comparing the phase differential actual to a phase differential threshold $\Delta\text{acceptable}$ to determine if the speech microphone is in the position away from the user's mouth.

17. The method of claim 15 wherein the phase differential threshold $\Delta\text{acceptable}$ is related to a speech recognition parameter.

18. The method of claim 12 further comprising performing speech recognition on the received signals from the speech microphone that are associated with the captured speech audio.

19. A system for improving a speech recognition process, said system comprising:
    a headset assembly comprising:
        a speech microphone configured to capture speech audio from a user and output corresponding electrical signals, the speech microphone attached a flexible boom and/or movable earpiece assembly allowing the speech microphone to be moved to a position away from the user's mouth,
        a compliance microphone, positioned on the headset assembly in a fixed location away from the user's mouth and configured to capture speech audio from the user and output corresponding electrical signals, and
        an earpiece speaker configured to transmit audio prompts to the user; and
    processing circuitry communicatively coupled to the speech microphone, the compliance microphone, and the earpiece speaker, the processing circuitry configured to:
        measure a transit time difference between the speech audio arriving at the speech microphone and the speech audio arriving at the compliance microphone,
        determine that the speech microphone has been moved to the position away from the user's mouth when the transit time difference is smaller than a threshold, and
        when the transit time difference is smaller than the threshold, transmit an audio prompt to the earpiece speaker advising the user to move the speech microphone to a position closer to the user's mouth.

\* \* \* \* \*